US005267846A

United States Patent [19]

Miyama et al.

[11] Patent Number: 5,267,846

[45] Date of Patent: Dec. 7, 1993

[54] DEVICE FOR PRODUCING WEATHER STRIP

[75] Inventors: Masayoshi Miyama; Hiroshi Togami; Hiroyoshi Imura; Toshiaki Yamaguchi, all of Chiba, Japan

[73] Assignee: Kinugawa Rubber Ind. Co., Ltd., Chiba, Japan

[21] Appl. No.: 922,017

[22] Filed: Jul. 28, 1992

[30] Foreign Application Priority Data

Jul. 30, 1991 [JP] Japan ................................ 3-189727

[51] Int. Cl.[5] ................................ B29C 47/28

[52] U.S. Cl. ................................ 425/113; 264/171; 264/171.1; 264/177.16; 425/131.1; 425/192 R; 425/462; 425/379.1

[58] Field of Search ... 264/171, 177.1, 177.14–177.19; 425/131.1, 133.5, 462, 192 R, 113, 379.1; 49/441, 440, 495

[56] References Cited

U.S. PATENT DOCUMENTS

| | | | |
|---|---|---|---|
| 4,187,270 | 2/1980 | Bartrum | 264/177.16 |
| 4,817,255 | 4/1989 | Shaw, Jr. . | |
| 4,830,898 | 5/1989 | Smith | 264/177.2 |
| 4,963,403 | 10/1990 | Roberts et al. . | |
| 4,969,293 | 11/1990 | Guillon | 49/441 |
| 4,969,294 | 11/1990 | Guillon et al. | 49/440 |
| 5,005,317 | 4/1991 | Augustin et al. | 49/495 |
| 5,007,202 | 4/1991 | Guillon | 49/441 |
| 5,013,379 | 5/1991 | Brooks et al. | 156/244.11 |
| 5,087,488 | 2/1992 | Cakmakci | 425/131.1 |
| 5,136,773 | 8/1992 | Mesnel et al. | 264/171 |
| 5,137,675 | 8/1992 | Rabe | 425/131.1 |

FOREIGN PATENT DOCUMENTS

| | | | |
|---|---|---|---|
| 0154121 | 9/1985 | European Pat. Off. . | |
| 0456483 | 11/1991 | European Pat. Off. . | |
| 3503200 | 5/1986 | Fed. Rep. of Germany | 425/131.1 |
| 4121552 | 1/1992 | Fed. Rep. of Germany . | |
| 2310207 | 12/1976 | France . | |
| 2437289 | 5/1980 | France | 425/133.5 |
| 2074092 | 10/1981 | United Kingdom . | |
| 2236978 | 4/1991 | United Kingdom . | |

*Primary Examiner*—Jeffery Thurlow
*Attorney, Agent, or Firm*—Bachman & LaPointe

[57] ABSTRACT

A device producing a weather strip is shown, which includes (a) leading a first uncured pasty material into a certain shaping passage to produce an uncured shaped molded strap; (b) applying continuously a second uncured pasty material onto a given portion of the uncured shaped molded strap while the latter is being moved in the certain shaping passage thereby to produce a layered uncured shaped molded strap; and (c) curing the layered uncured shaped molded strap.

5 Claims, 4 Drawing Sheets

17 49a 47 47c 53b 53 53b 55 49b 47b 49 51a 53a 47b 53b 55 47a 53b 21 47b 51 51b 19 41 39 39b 39b 43 13 43b 43b 45 45b 45b 45a 45b 35 39b 43b 43b 45b 39b 39a 43a 41

33
31
29
27
25
17
23
21
15
19
13

55
55
53b
53a
53b
53
53b
53b
47c
47b
47
47b
47a
47b
17
49a
49b
49
21
51
51b
51a
19
45b
45a
45b
45
45b
45b
43b
43b
43
43a
43b
43b
39b
39b
39a
39b
39b
39
41
41
13
35

DEVICE FOR PRODUCING WEATHER STRIP

BACKGROUND OF THE INVENTION

1. Field of the Invention

The present invention relates in general to a weather strip which is mounted to an automotive door window frame, an automotive door opening or the like, and more particularly, the present invention relates to a method and a device for producing such weather strips.

2. Description of the Prior Art

In order to clarify the task of the present invention, a known weather strip used in the above-mentioned automotive field will be described with reference to FIG. 7 of the accompanying drawings.

The known weather strip shown in the drawing is a glass runner 10 which is mounted to the inside wall of an automotive window frame 100.

The glass runner 10 is generally constructed of elastic material, such as natural rubber, synthetic rubber, thermosetting resin or the like.

The glass runner 10 comprises a base portion 1 attached to the window frame 10, side wall portions 3 and 5 raised from both sides of the base portion 1, and lip portions 3*a* and 5*a* extending inwardly downward and obliquely from respective tops of the side wall portions 3 and 5 toward the base portion 1. The base portion, the side wall portions 3 and 5 and the lips 3*a* and 5*a* constitute a glass runner proper 10'.

Designated by numeral 7 is a window glass which is slidably contactable with the lip portions 3*a* and 5*a* during its opening and closing movement.

The inside wall of the base portion 1 and the outside walls of the lip portions 3*a* and 5*a* are each equipped with a low friction layer 11 for improving the sliding ability of the window glass 7 relative to the glass runner 10. Due to provision of such friction layers 11, the wear resistance of the glass runner 10 against the window glass 7 is also increased.

The friction layer 11 is usually constructed of thermoplastic resin, such as polyethylene resin (PE), polypropylene resin (PP) or the like.

In order to produce weather strips 10 of the type described hereinabove, many methods have been proposed and put into practical use. Some of them are shown in Japanese Patent First Provisional Publications Nos. 2-269039, 2-269040, 2-269041, 3-24947 and 2-212118. In fact, these publications disclose various methods for providing the glass runner proper 10' with the friction layers 11.

In these conventional methods, the glass runner proper 10' and the friction layer 11 are produced or molded by two different extrusion molding machines, and thereafter the molded two are united through suitable coupling method, such as method of using adhesive, method of partially melting the friction layers 11, method of using a welding device, or the like.

However, such conventional methods have required troublesome working steps due to the usage of two molding machines. This induces increase in production cost of the weather strips. Furthermore, the above-mentioned conventional methods have failed to provide a satisfied joining between the glass runner proper 10' and the friction layers 11.

SUMMARY OF THE INVENTION

It is therefore an object of the present invention to provide a method and a device of producing a weather strip, which is free of the above-mentioned drawbacks.

According to a first aspect of the present invention, there is provided a method of producing a weather strip, which comprises (a) leading a first uncured pasty material into a certain shaping passage to produce an uncured shaped molded strip; (b) applying continuously a second uncured pasty material onto a given portion of the uncured shaped molded strip while the latter is being moved in the certain shaping passage thereby to produce a layered uncured shaped molded strip; and (c) curing the layered uncured shaped molded strip.

According to a second aspect of the present invention, there is provided a combination extrusion head assembly which is used in a weather strip production line including first and second material suppliers. The head assembly comprises a body assembly having a shaping passage formed therethrough, the shaping passage having an upstream opening into which a first uncured material is fed from the first material supplier; means for defining in the body assembly a passage, the passage having one open end exposed to a given portion of the shaping passage and the other open end communicated with the second material supplier, so that a second uncured material is fed to the given portion from the second material supplier through the passage; and means for heating the first and second uncured materials fed to the shaping passage.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
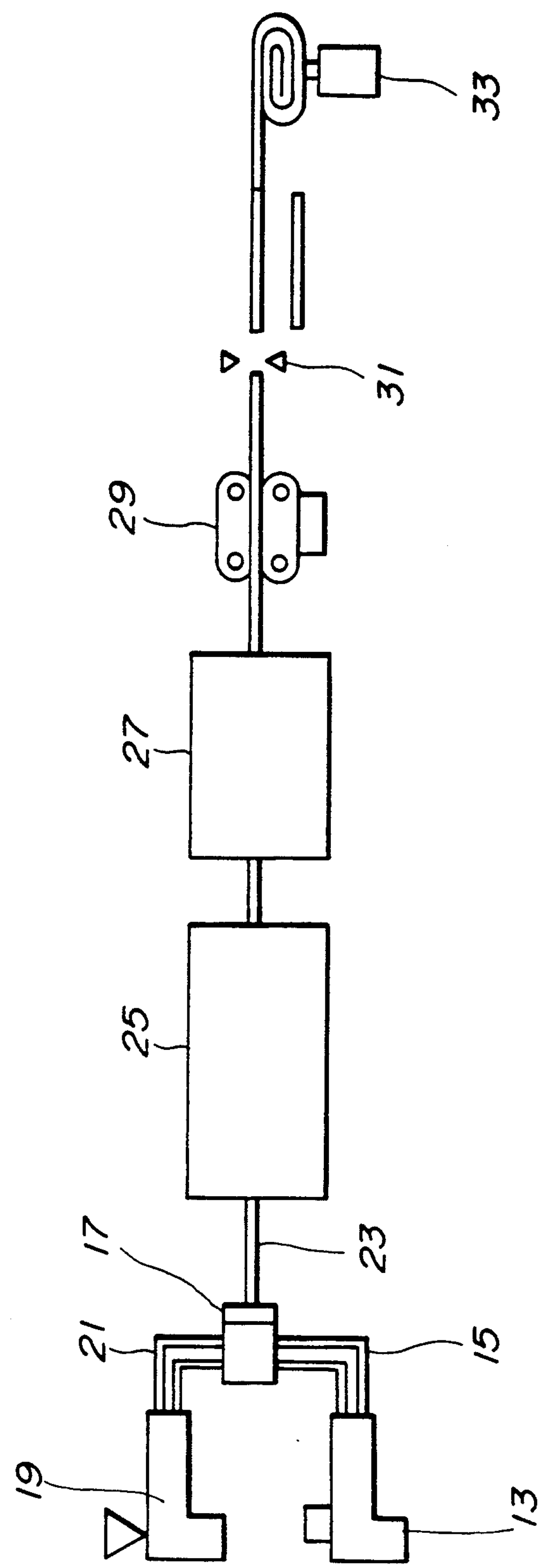
FIG. 1 is a schematic view of a production line which carries out the method of the present invention.

Referring to FIG. 1 of the drawings, there is shown a production line in which the method of the present invention is practically carried out.

The production line comprises a rubber material supplier 13 from which a rubber material carrying track 15 extends to a combination extrusion head assembly 17.

The rubber material supplier 13 is fed with an unvulcanized rubber material which includes suitable amounts of polymer(s), carbon, oil, vulcanizing agent, etc.,. As the polymer, ethylene-propylene rubber (EPDM), styrene-butadiene rubber (SBR), polychloroprene (CR), acrylonitrile-butadiene/polyvinyl chloride copolymer (NBR/PVC), chlorosulfonated polyethylene (CSM) and acrylic rubber (ACM) are used in single or combined fashion. The carbon is of the grade "MAF", "FEF" or "SRF". The oil is of paraffinic type, naphthenic type, aromatic type, or be dioctyl phthalate (DOP), or dioctyl adipic acid (DOA). As the vulcanizing agent, thiazole type, thiuram type or dithiocarheminic acid guanidine type is used.

Table-1 shows the mixing ratio of components of each rubber material.

TABLE 1

| composition | polymer | | | | |
|---|---|---|---|---|---|
| | EPDM | SBR/EP | IR/EP | NBR/PVC | CR |
| — | 100 | 60/40 | 60/40 | 70/3 | 100 |
| carbon | 30–100 | 30–100 | 30–100 | 20–60 | 30–100 |
| oil | 10–100 | 10–80 | 10–100 | 0–60 | 10–80 |
| white filler | 0–60 | 0–100 | 0–60 | 0–60 | 0–60 |
| processing aid | 1–10 | 1–10 | 1–10 | 1–10 | 1–10 |
| vulcanizing agent | 0.8–2.0 | 0.8–2.0 | 0.8–2.0 | 0.8–2.0 | 0.8–2.0 |
| vulcanization accelerating agent | 2–5 | 2–5 | 2–5 | 2–5 | 2–5 |
| ZnO | 5–10 | 5–10 | 5–10 | 5–10 | 5–10 |
| dehydrating agent | 3–7 | 3–7 | 3–7 | 3–7 | 3–7 |

Referring back to FIG. 1, designated by numeral 19 is a plastic material supplier from which a plastic material carrying track 21 extends to the combination extrusion head assembly 17. That is, the plastic material supplier 19 and the above-mentioned rubber material supplier 13 are arranged in parallel with respect to the combination extrusion head assembly 17.

The plastic material supplier 19 is fed with an uncured thermoplastic material, such as polyethylene (PE), polypropylene (PP) or the like.

As will become apparent as the description proceeds, by simultaneously receiving the rubber material from the rubber material supplier 13 and the plastic material from the plastic material supplier 19, the combination extrusion head assembly 17 extrudes a continuous shaped strip 23 which has a layered structure. The strip from the head assembly 17 is led into a vulcanizing oven 25 and then into a cooling tunnel 27. For achieving this movement of the strip 23, a drawing machine 29 is arranged downstream of the cooling tunnel 27. The strip 23 thus cooled by the cooling tunnel 27 is cut into pieces by a cutting machine 31. The cut pieces are then neatly taken up by a take-up machine 33.

Figure 2:
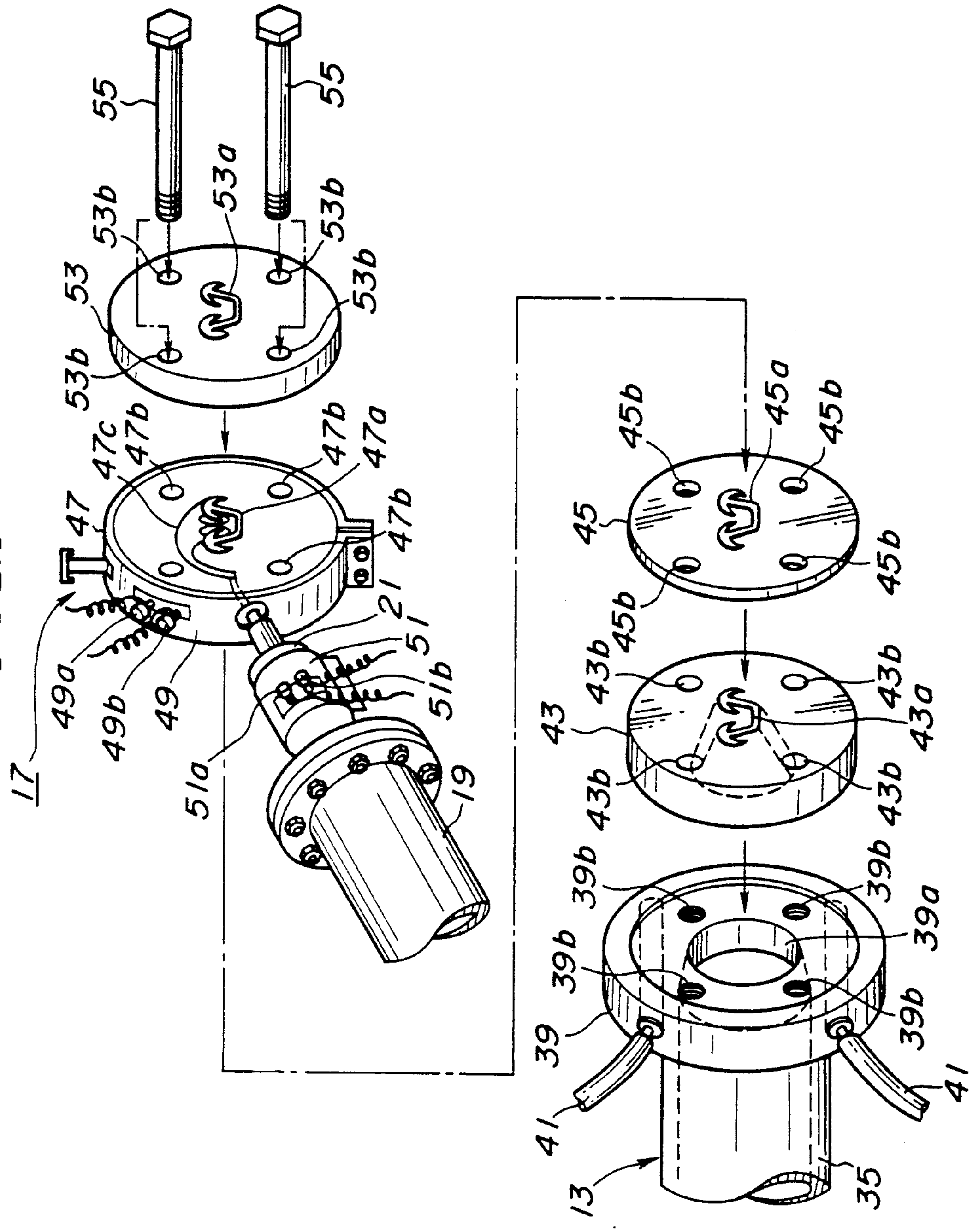
FIG. 2 is an exploded view of a combination extrusion head assembly which is used in the production line of FIG. 1.
Figure 3:
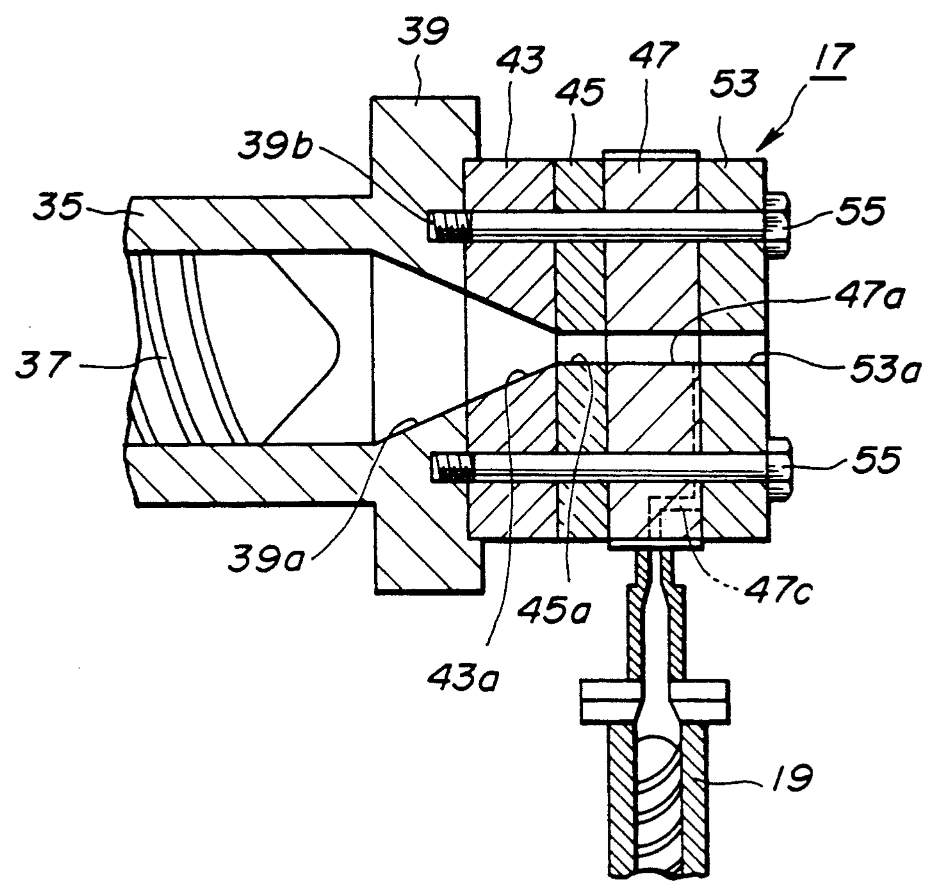
FIG. 3 is an enlarged sectional view of an essential part of the combination extrusion head assembly of FIG. 2.

Referring to FIGS. 2 and 3, there is shown in detail the combination extrusion head assembly 17 by which the layered and shaped strip 23 is continuously extruded.

In the drawings, denoted by numeral 35 is a cylinder barrel in which an extruding screw 37 (see FIG. 3) is installed. The cylinder barrel 35 is communicated with the rubber material supplier 13. Thus, upon rotation of the extruding screw 37, the unvulcanized rubber material, which has been already mixed in the supplier 13, is flowed downstream in the barrel 35. The cylinder barrel 35 has an enlarged head portion 39 in which a conical bore **39*a* merged with the bore of the barrel 35 is formed. The head portion 39 has at its outer side a circular recess 39*c* which is concentric with the conical bore 35*a*. Furthermore, the head portion 39 has at the circular recess 39*c* four threaded bolt holes 39*b***.

Although not shown in the drawings, the wall of the cylinder barrel 35 is formed with a steam jacket for heating the unvulcanized rubber material in the barrel 35. Steam inlet and outlet hoses 41 are connected to the head portion 39 to flow steam in the steam jacket.

Designated by numeral 43 is an annular inside mouth piece which is snugly received in the circular recess **39*c* of the cylinder barrel 35. As shown, the inside mouth piece 43 is formed with a shaping aperture 43*a* which is shaped to correspond to the section of a product, viz., the produced weather strip 10*a* (see FIG. 4). As is understood from FIG. 3, the aperture 43*a* is tapered so as to be smoothly merged with the conical bore 39*a* of the cylinder barrel head portion 39. The piece 43 is further formed with four bolt holes 43*b* which are mated with the four threaded bolt holes 39*b* of the cylinder barrel head portion 39**.

Attached to the inside mouth piece 43 is a circular heat insulating plate 45 which is constructed of ceramics, fluorocarbon resin or the like. The insulating plate 45 has a shaping aperture **45*a* which is shaped to correspond to the section of the produced weather strip 10*a*. This plate 45 has also four bolt holes 45*b* which are mated with the four bolt holes of the mouth piece 43**.

Attached to the heat insulating plate 45 is a circular head body 47 which has a shaping aperture **47*a* identical to the shaping aperture 45*a* of the heat insulating plate 45. This head body 47 has also four bolt holes 47*b* which are mated with the four bolt holes 45*b* of the heat insulating plate 45**.

As is seen from FIGS. 2 and 3, the circular head body 47 is formed with a passage **47*c* which extends from the outer surface of the head body 47 to the shaping aperture 47*a* of the same. The passage 47*c* is communicated with the plastic material supplier 19** to be fed with the uncured plastic material.

As will be understood from FIG. 2, the passage **47*c* is exposed to the shaping aperture 47*a* through three openings (no numerals), two being openings exposed to portions of the shaping aperture 47*a*, which portions correspond to positions where the inside lips 3*a* and 5*a* of the produced weather strip 10*a* (see FIG. 4) are located, and the remaining one being an opening exposed to a portion of the aperture 47*a* which portion corresponds to a position where a base portion 1 of the product 10*a* (see FIG. 4**) is located.

As is seen from FIG. 2, the head body 47 has an annular electric heater 49 disposed thereabout. The heater 49 is equipped with terminals **49*a* and 49*b* to which lead wires from an electric power source (not shown) are connected. Similar to this, the material carrying track 21 from the plastic material supplier 19 has an annular electric heater 51 disposed thereabout. The heater 51 is equipped with terminals 51*a* and 51*b***.

Attached to the circular head body 47 is an annular outside mouth piece 53 which has a shaping aperture **53*a* identical to the shaping aperture 47*a* of the circular head body 47. The outside mouth piece 53 also has four bolt holes 53*b* which are mated with the four bolt holes 47*b* of the head 47**.

The cylinder barrel 35, the inside mouth piece 43, the heat insulating plate 45, the head body 47 and the outside mouth piece 53 are tightly combined by four connecting bolts 55 which are received in the mated bores 53*b*, 47*b*, 45*b* and 43*b* and screwed into the threaded bolt holes 39*b* of the cylinder barrel head portion 39.

In the following, operation of the combination extrusion head assembly 17 will be described. During operation, the cylinder barrel 35, the head body 47 and the material carrying track 21 of the plastic material supplier 19 are kept heated at desired temperatures.

Due to rotation of the extruding screw 37, the unvulcanized rubber material led into the cylinder barrel 35 from the rubber material supplier 13 is forced into the shaping aperture 43*a* of the inside mouth piece 43 and then into the shaping aperture 45*a* of the heat insulating plate 45. Thus, the rubber material extruded from the aperture 45*a* is forced to have a desired shape. During this extrusion process, the rubber material can keep its desired fluidity due to the heat applied thereto by the steam in the steam jacket of the cylinder barrel 35.

The shaped rubber material from the shaping aperture 45*a* is then led into the shaping aperture 47*a* of the head body 47. During this process, the uncured but pasty plastic material from the plastic supplier 19 is led into the shaping aperture 47*a* through the above-mentioned three openings, so that three strips of the plastic material are continuously applied to three given portions of the shaped rubber material. Due to heat produced by the two heaters 49 and 51, the plastic material can keep its desired fluidity.

The shaped rubber material thus applied with the three strips (which will be referred to as a continuous shaped strip 23 hereinafter) of the plastic material is forced into the shaping aperture 53*a* of the outside mouth piece 53 and then extruded from the combination extrusion head assembly 17. The continuous shaped strip 23 is then led into the vulcanizing open 25 for its curing and then led into the cooling tunnel 27. The strip 23 thus cooled and hardened is then cut into pieces by the cutting machine 31 and neatly took up by the take-up machine 33, as is seen from FIG. 1.

During the above-mentioned extrusion process, the temperature of the extruding screw 37 should be kept at about 30° C., the temperature of the cylinder barrel 35 should be kept at about 30° C. to 60° C., the temperature of the head portion 39 should be kept at about 40° to 70° C., the temperature of the inside mouth piece 43 should be kept at about 40° C. to 100° C., and the temperature of the head body 47 should be kept at about 120° C. to 300° C. The temperature of the vulcanizing oven 25 should be kept at about 150° C. to 250° C. Of course, these temperatures must be changed in accordance with the types of the rubber and plastic materials used. Thus, when occasion demands, cooling water may be fed to the steam jacket of the cylinder barrel 35 in place of the steam.

Besides the above-mentioned polyethylene resin (PE) and polypropylene resin (PP), various plastic materials may be used, which are, for example, ethylene-vinyl acetate copolymer (EVA), polyamide (PA), polyacetal (POM), polycarbonate resin, polysulfonic resin, polyvinyl chloride (PVC) and TPE resin. Furthermore, if desired, fluorine type resin (PTFE) or micro capsule containing molybdenum disulfide, graphite, silicon oil, wax or oily material may be mixed with the plastic material. With this mixture, slidablity and water repellency of the three strips (viz., the low friction layer 11) are improved.

Figure 4:
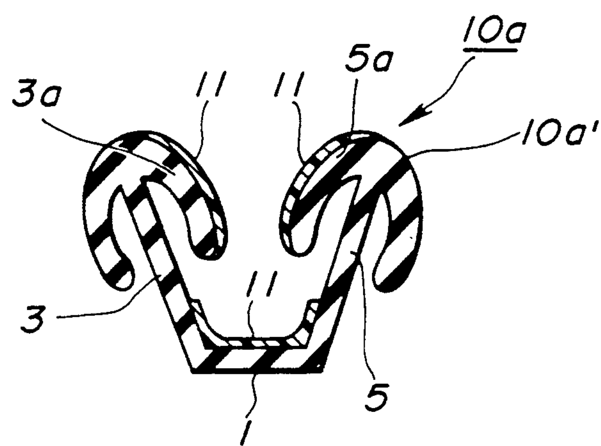
FIG. 4 is a sectional view of a weather strip which is produced by the production line of FIG. 1.

FIG. 4 shows the weather strip 10*a* produced through the above-mentioned process. As will be seen from this drawing, the three low friction layers 11 formed on the given surfaces of the glass runner proper 10*a*' are the cured three strips of the plastic material.

Figure 5:
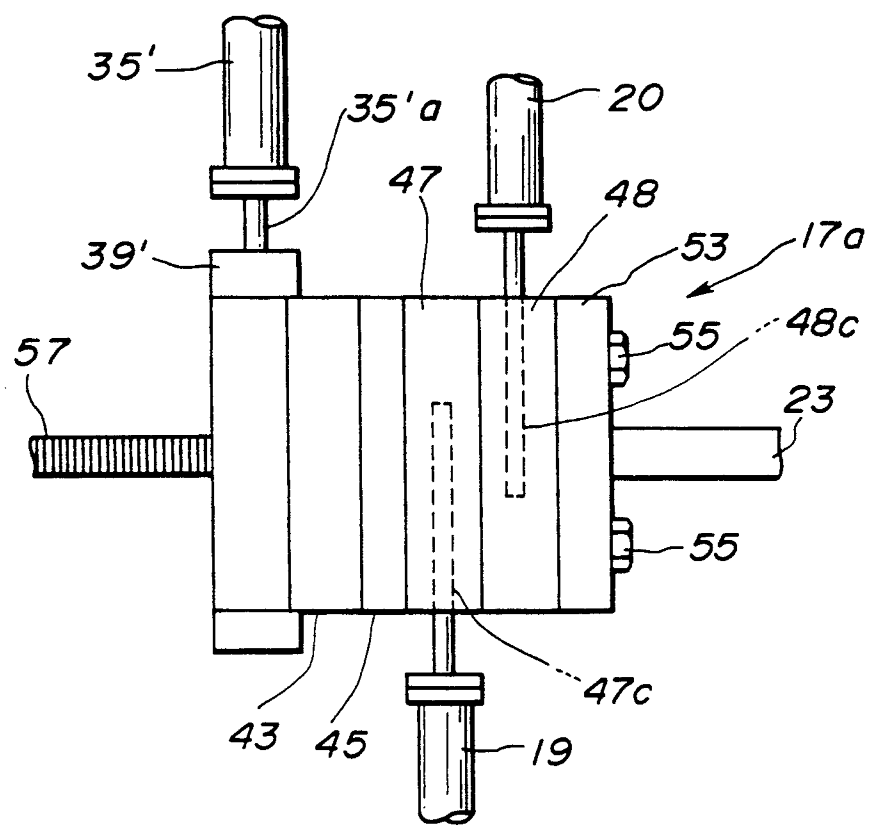
FIG. 5 is a side view of a modified combination extrusion head assembly.

Referring to FIG. 5, there is shown a modification 17*a* of the above-mentioned combination extrusion head assembly 17. Since the modification 17*a* is similar in construction to the above-mentioned head assembly 17, the detailed description of the modification 17*a* will be directed to only parts and constructions which are different from those of the head assembly 17, and the substantially same parts are denoted by the same numerals.

In the modification 17*a*, a separate annular body 39' is used, which corresponds to the head portion 39 of the above-mentioned head assembly 17. A cylinder barrel 35' communicated with the rubber material supplier 13 is connected through a thinner pipe 35'*a* to a side wall of the annular body 39'. The inside mouth piece 43, the heat insulating plate 45 and the head body 47 are connected to the annular body 39' in this order.

The annular body 39' has at its front face an opening (not shown) through which an elongate metal core member 57 is continuously fed into the head assembly 17*a* for the reason which will become clarified therein after.

Another head body 48 is further employed in this modification, which is attached to the head body 47 and is similar in construction to the head body 47. A passage 48*c* formed in the other head body 48 is communicated with another plastic material supplier 20. The passage 48*c* of the other head body 48 is exposed to the corresponding shaping aperture (not shown) through two openings. These two openings are exposed to portions of the corresponding shaping aperture, which portions correspond to positions where the outside lips 12 (see FIG. 6) are located.

The outside mouth piece 53 is attached to the other head body 48.

The annular body 39', the inside mouth piece 43, the heat insulating plate 45, the two head bodies 47 and 48 and the outside mouth piece 53 are tightly combined by the four connecting bolts 55.

Figures 6, 7:
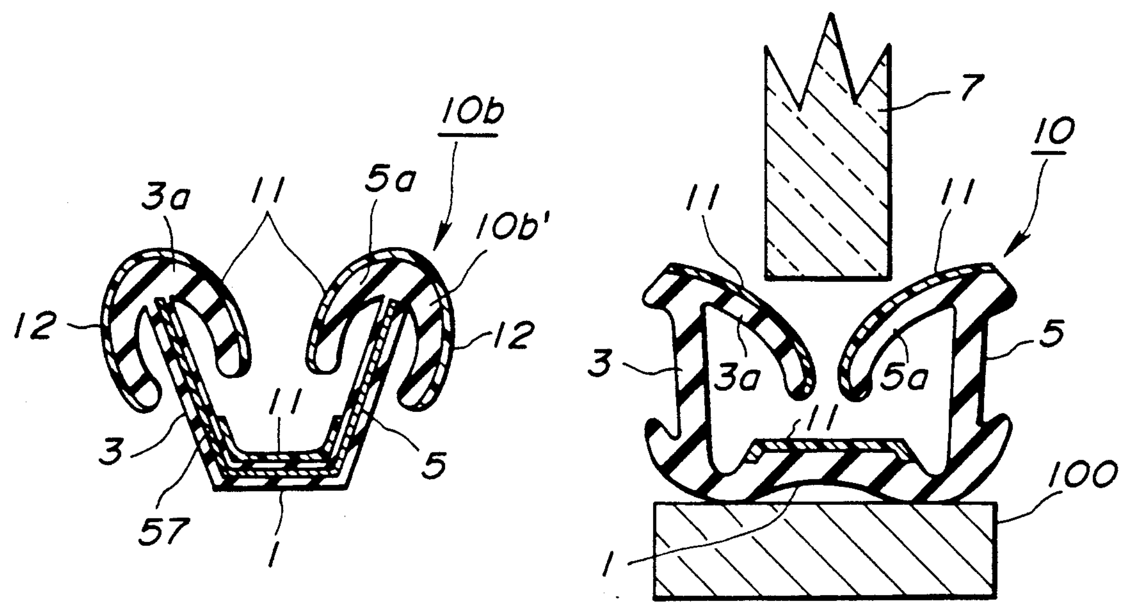
FIG. 6 is a view similar to FIG. 4, but showing a weather strip produced by a production line in which the modified combination extrusion head assembly is installed.
FIG. 7 is a sectional view of a weather strip which is produced through a known method.

In operation, the unvulcanized rubber material from the rubber material supplier 13 is led through the cylinder barrel 35' into the annular body 39' and then forced into the shaping bore (viz., the mated shaping apertures) of the head assembly 17*a*. In synchronization with the movement of the rubber material, the metal core member 57 is inserted into the head assembly 17*a*, and the uncured by pasty plastic materials from the plastic suppliers 19 and 20 are led into the corresponding shaping apertures through the respective openings. Thus, the strip 23 extruded from the head assembly 17*a* can have such a section as shown in FIG. 6. Of course, the strip 23 is thereafter led into the vulcanizing oven 25 and the cooling tunnel 27 before being cut into pieces by the cutting machine 31.

FIG. 6 shows the weather strip 10*b* produced by the line in which the modified head assembly 17*a* is used. As shown, the metal core member 57 is embedded in the glass runner proper 10*b*'. The three low friction layers 11 are produced by the plastic material from the plastic supplier 19, while the other two low friction layers 12 are produced by the plastic material from the other plastic supplier 20. As is understood from this drawing, by suitably selecting the positions of the material feeding openings of the two head bodies 47 and 48, it is possible to provide a united structure of the two layers 11 and 12 on each lip portion 3*a* or 5*a*.

Although the above description is directed to the embodiments in which a rubber material is used as the material for the glass runner proper 10a' or 10b', thermosetting plastic materials may be also used for the glass runner proper.

What is claimed is:

1. In a weather strip production line including first and second material suppliers, a combination extrusion head assembly comprising:

a cylinder barrel through which unvulcanized rubber material fed from said first material supplier is forced to flow toward a downstream open end thereof;

first heating means for heating said downstream open end of said cylinder barrel;

an inside mouth piece having a shaping aperture and attached to said open end of said cylinder barrel;

a heat insulating plate having a shaping aperture and attached to said inside mouth piece;

a head body having a shaping aperture and attached to said heat insulating plate, said head body having a material feeding passage formed therein, said material feeding passage having one open end exposed to a given portion of the shaping aperture of the head body and the other open end communicated with said second material supplier, so that a thermoplastic material is fed to said given portion from said second material supplier through said material feeding passage;

an outside mouth piece having a shaping aperture and attached to said head body;

means for uniting said inside mouth piece, said heat insulating plate, said heat body and said outside mouth piece in a manner to connect the respective shaping apertures and mounting the united structure to said cylinder barrel; and second heating means for heating said head body.

2. A combination extrusion head assembly as claimed in claim 1, in which the open end of said material feeding passage exposed to the shaping aperture of said head body is divided into at least two portions.

3. A combination extrusion head assembly as claimed in claim 1, further comprising another head body which has a shaping aperture and is disposed between said previously mentioned head body and said outside mouth piece, said another head body having another material feeding passage formed therein, said material feeding passage having one open end exposed to a given portion of the shaping aperture of said another head body and the other open end communicated with a third material supplier, so that a thermoplastic material is fed to said given portion from said third material supplier through said another material feeding passage.

4. A combination extrusion head assembly as claimed in claim 3, in which the open end of said another material feeding passage exposed to the shaping aperture of said another head body is divided into at least two portions.

5. A combination extrusion head assembly as claimed in claim 2, further comprising a structure which is arranged between said cylinder barrel and said inside mouth piece, said structure being formed with another opening through which a metal core member for the produced weather strip is to be inserted.

* * * * *